(12) United States Patent
Lee et al.

(10) Patent No.: US 9,664,286 B2
(45) Date of Patent: *May 30, 2017

(54) GASKET AND THE MANUFACTURING METHOD THEREOF

(71) Applicant: KUK IL INNTOT CO., LTD., Ulsan (KR)

(72) Inventors: Jong Chul Lee, Ulsan (KR); Eui Hwan Son, Ulsan (KR)

(73) Assignee: KUK IL INNTOT CO., LTD., Ulsan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,506

(22) Filed: Sep. 7, 2016

(65) Prior Publication Data

US 2016/0377179 A1    Dec. 29, 2016

Related U.S. Application Data

(63) Continuation of application No. 15/066,314, filed on Mar. 10, 2016, now Pat. No. 9,464,718.

(60) Provisional application No. 62/300,309, filed on Feb. 26, 2016, provisional application No. 62/132,690, filed on Mar. 13, 2015.

(51) Int. Cl.
| | |
|---|---|
| *F16J 15/12* | (2006.01) |
| *F16J 15/08* | (2006.01) |
| *F16J 15/02* | (2006.01) |
| *F16L 23/20* | (2006.01) |
| *F16L 23/18* | (2006.01) |
| *F16L 23/24* | (2006.01) |

(52) U.S. Cl.
CPC ........ *F16J 15/0887* (2013.01); *F16J 15/022* (2013.01); *F16J 15/0806* (2013.01); *F16J 15/121* (2013.01); *F16J 15/128* (2013.01); *F16L 23/18* (2013.01); *F16L 23/20* (2013.01); *F16L 23/24* (2013.01)

(58) Field of Classification Search
CPC ........ F16J 15/122; F16J 15/121; F16J 15/125; F16J 15/126; F16J 15/127; F16J 15/128
See application file for complete search history.

(56) References Cited

U.S. PATENT DOCUMENTS

| | | |
|---|---|---|
| 1,838,496 A | 12/1931 | Oven |
| 2,357,257 A | 8/1944 | Goetze |
| 2,442,312 A | 5/1948 | Price |

(Continued)

*Primary Examiner* — Gilbert Lee
(74) *Attorney, Agent, or Firm* — Cantor Colburn LLP

(57) ABSTRACT

A gasket includes: a spiral wound gasket; a first O-ring member located inner side of the spiral wound gasket; a second O-ring member located outer side of the spiral wound gasket; a first core spring located inside the first O-ring member; a second core spring located inside the second O-ring member; a first jacket formed with an opening portion and accommodating the spiral wound gasket, the first O-ring member, and the second O-ring member inside thereof through the opening portion; a second jacket formed with an opening portion at the one end thereof and accommodating the spiral wound gasket, the first O-ring member, and the second O-ring member, and the first jacket inside thereof through the opening portion; a first sealing layer being formed on the first jacket; a second sealing layer to cover the first sealing layer; and a third sealing layer being formed on the second jacket.

24 Claims, 13 Drawing Sheets

(56) References Cited

U.S. PATENT DOCUMENTS

| | | | |
|---|---|---|---|
| 3,815,927 A | | 6/1974 | Geipel |
| 5,518,257 A | | 5/1996 | Breaker |
| 5,609,344 A | * | 3/1997 | Tamaoki ................ F16J 15/125 |
| | | | 277/609 |
| 5,921,558 A | | 7/1999 | Kozerski |
| 6,517,086 B1 | | 2/2003 | Jamrog |
| 2009/0115139 A1 | | 5/2009 | Jenkins et al. |

* cited by examiner

GASKET AND THE MANUFACTURING METHOD THEREOF

CROSS-REFERENCE TO RELATED APPLICATION

This application is a continuation of U.S. patent application Ser. No. 15/066,314 filed on Mar. 10, 2016, which claims priority to and the benefit of U.S. Provisional Application No. 62/300,309 filed on Feb. 26, 2016; and U.S. Provisional Application No. 62/132,690 filed on Mar. 13, 2015, and the entire disclosures of which are incorporated herein by reference.

BACKGROUND

1. Technical Field

The present invention relates to a gasket, more specifically to a metal gasket having a structure wherein a pair of metal jackets encompasses both the upper side and the lower side of a spiral wound gasket.

2. Description of Related Art

Gasket is a general term of a static seal which is coupled to a stationary joint surface and the like of a pressure container, a tube flange, and a mechanical apparatus with bolt(s) and the like for preventing leaks, and various kinds of shapes, materials, and the like are used according to the usage state of type, pressure, temperature, and the like of the operating fluids.

At first, gaskets have been simply used using materials such as paper, leather, and the like. However, various shapes and materials are being used recently, as the operational conditions have become complicated and rigorous.

That is, a gasket is inserted between the two pipe bodies being connected to each other in order to prevent the leakage of a fluid through the gap between the two pipe bodies. For example, a gasket is interposed between the flanges which are the connecting portions of the pipe bodies such as valves, pipes, or the like which transfer fluids so as to prevent the leakage of the fluids, and at the same time, has a sealing function which prevents the external substances from being entering into the inside of the pipe bodies. That is, when coupling flanges of valves, pipes, and the like, the volume of the gasket is compressed by the pressure applied along the axis so that the joint between the flanges, which are the connecting portions thereof, is blocked from the outside.

Such a gasket, which is actually installed in a plant and being used, must maintain the sealing state in response to various environments and conditions.

For example, the size and the position of the flanges, and the bolting process for joining should be considered. More particularly, when the operating condition is a continuous repetition of heating and cooling so that a high-temperature and high-pressure fluid is repeatedly flowing inside the pipe body, maintaining the perfect flatness of the flanges 2, which are the connecting portions of the pipe bodies 1, along the horizontal direction becomes difficult, therefore the gap between the flanges 2 may unevenly widened as illustrated in FIG. 1 (D2>D1).

That is, the gasket installed between the flanges must overcome this difference and maintain the sealing state, and in order to achieve this, the yield point of the gasket along the sealing direction must be high and the restoring strength thereof must be large.

However, under the state wherein gaps A, B, and C are present between the contact surface of the flanges of the pipe bodies as illustrated in FIG. 2, when the gasket is installed with a high load or re-bolting work is performed on the operating flanges, the hoops 5 or the fillers 6 of the spiral wound gasket of the prior art could be separated through these gaps, therefore there is a risk in that the gasket is damaged and the fluid are being leaked.

SUMMARY

An objective of the present invention devised to solve above described problems is to provide a gasket and the manufacturing method thereof capable of preventing the hoops or the fillers of the spiral wound gasket from separation therefrom and damaging the gasket.

Another objective of the present invention is to provide a gasket and the manufacturing method thereof wherein the sealing property is further enhanced by providing O-ring member between spiral wound gasket and the jacket made of metal.

Yet another objective of the present invention is to provide a gasket and the manufacturing method thereof wherein the sealing members are provided at both sides of the spiral wound gasket so that they are expanded in accordance with the changes of an internal or an external pressure, thereby obtaining the sealing property.

Still yet another objective of the present invention is to provide a gasket and the manufacturing method thereof wherein the damage of the sealing surface of the gasket can be prevented through the sealing layer provided in the first jacket and the second jacket, thereby further enhancing the sealing property.

In order to achieve the above described objectives, the present invention provides a gasket characterized in that and includes: a spiral wound gasket; a first O-ring member located inner side of the spiral wound gasket; a second O-ring member located outer side of the spiral wound gasket; a first core spring located inside the first O-ring member; a second core spring located inside the second O-ring member; a first jacket formed with an opening portion at the one end thereof and accommodating the spiral wound gasket, the first O-ring member, and the second O-ring member inside thereof through the opening portion; a second jacket formed with an opening portion at the one end thereof and accommodating the spiral wound gasket, the first O-ring member, and the second O-ring member, and the first jacket inside thereof through the opening portion; a first sealing layer being formed on the first jacket through the opening portion of the second jacket; a second sealing layer being formed to cover the first sealing layer; and a third sealing layer being formed on the second jacket in the opposite side of the second sealing layer.

In addition, the present invention provides a gasket characterized in that and includes: a spiral wound gasket; a first O-ring member located inner side of the spiral wound gasket; a second O-ring member located outer side of the spiral wound gasket; a first core spring located inside the first O-ring member; a second core spring located inside the second O-ring member; a first jacket formed with an opening portion at the one end thereof and accommodating the spiral wound gasket, the first O-ring member, and the second O-ring member inside thereof through the opening portion; an internal sealing layer being formed on the spiral wound gasket through the opening portion of the first jacket; a second jacket formed with an opening portion at the one end thereof and accommodating the spiral wound gasket, the first O-ring member, the second O-ring member, the internal sealing layer, and the first jacket inside thereof through the opening portion; an external sealing layer being formed to cover the first jacket through the opening portion of the second jacket; and a third sealing layer being formed on the second jacket in the opposite side of the external sealing layer.

In addition, the present invention provides a gasket characterized in that and includes: a spiral wound gasket; a first C-ring member located inner side of the spiral wound gasket; a second C-ring member located outer side of the spiral wound gasket; a first core spring located inside the first C-ring member; a second core spring located inside the second C-ring member; a first jacket formed with an opening portion at the one end thereof and accommodating the spiral wound gasket, the first O-ring member, and the second O-ring member inside thereof through the opening portion; a second jacket formed with an opening portion at the one end thereof and accommodating the spiral wound gasket, the first O-ring member, and the second O-ring member, and the first jacket inside thereof through the opening portion; a first sealing layer being formed on the first jacket through the opening portion of the second jacket; a second sealing layer being formed to cover the first sealing layer; and a third sealing layer being formed on the second jacket in the opposite side of the second sealing layer.

In addition, the present invention provides a gasket characterized in that and includes: a spiral wound gasket; a first C-ring member located inner side of the spiral wound gasket; a second C-ring member located outer side of the spiral wound gasket; a first core spring located inside the first C-ring member; a second core spring located inside the second C-ring member; a first jacket formed with an opening portion at the one end thereof and accommodating the spiral wound gasket, the first O-ring member, and the second O-ring member inside thereof through the opening portion; an internal sealing layer being formed on the spiral wound gasket through the opening portion of the first jacket; a second jacket formed with an opening portion at the one end thereof and accommodating the spiral wound gasket, the first O-ring member, the second O-ring member, the internal sealing layer, and the first jacket inside thereof through the opening portion; an external sealing layer being formed to cover the first jacket through the opening portion of the second jacket; and a third sealing layer being formed on the second jacket in the opposite side of the external sealing layer.

In addition, a gasket is provided, characterized in that the opening portion of the first C-ring member is formed towards the inside of the gasket, and the opening portion of the second C-ring member is formed towards the inside of the gasket.

In addition, a gasket is provided, characterized in that the opening portion of the first C-ring member is formed towards the outside of the gasket, and the opening portion of the second C-ring member is formed towards the outside of the gasket.

In addition, a gasket is provided, characterized in that the opening portion of the first C-ring member is formed towards the contact surface of the flange wherein the gasket is mounted, and the second C-ring member is formed towards the contact surface of the flange wherein the gasket is mounted.

In addition, a gasket is provided, characterized in that the opening portion of the first C-ring member is formed towards the inside of the gasket, and the opening portion of the second C-ring member is formed towards the outside of the gasket.

In addition, a gasket is provided, characterized in that the first core spring is a flat coil spring, and the second core spring is a flat coil spring.

In addition, a gasket is provided, characterized in that the spiral wound gasket is formed by winding the hoop and the filler alternately and repeatedly, and the hoop is formed in the shape of an inverted "W" comprising two peaks and one valley, and the two peaks of the hoops are directing towards the outside of the gasket.

In addition, a gasket is provided, characterized in that the filler is formed with any one of carbon, ceramics, and mica, or formed with a combination of these elements. That is the filler can be made of a non-asbestos material.

In addition, a gasket is provided, characterized in that the first sealing layer, the second sealing layer, and the third sealing layer are formed with any one of carbon, mica, polytetrafluoroethylene (PTFE), silver, and atomized stainless steel, or a combination of these elements.

In addition, a gasket is provided, characterized in that the internal sealing layer, the external sealing layer, and the third sealing layer are formed with any one of carbon, mica, polytetrafluoroethylene (PTFE), silver, and atomized stainless steel, or a combination of these elements.

In addition, the present invention provides a manufacturing method of a gasket characterized in that and includes the steps of: mounting a first O-ring member and a second O-ring member provided with a core spring into the inside of a first jacket; mounting a spiral wound gasket between the first O-ring member and the second O-ring member; encasing the first O-ring member, the second O-ring member, the spiral wound gasket, and the first jacket with a second jacket; forming a first sealing layer on the first jacket through the opening portion of the second jacket; forming a second sealing layer to cover the first sealing layer; and forming a third sealing layer on the second jacket in the opposite side of the second sealing layer.

In addition, the present invention provides a manufacturing method of a gasket characterized in that and includes the steps of: mounting a first O-ring member and a second O-ring member provided with a core spring into the inside of a first jacket; mounting a spiral wound gasket between the first O-ring member and the second O-ring member; forming an internal sealing layer on the spiral wound gasket through the opening portion of the first jacket; encasing the first O-ring member, the second O-ring member, the spiral wound gasket, the internal sealing layer, and the first jacket with a second jacket; forming a external sealing layer to cover the first jacket through the opening portion of the second jacket; and forming a third sealing layer on the second jacket in the opposite side of the external sealing layer.

In addition, the present invention provides a manufacturing method of a gasket characterized in that and includes the steps of: mounting a first C-ring member and a second C-ring member provided with a core spring into the inside of a first jacket; mounting a spiral wound gasket between the first C-ring member and the second C-ring member; encasing the first C-ring member, the second C-ring member, the spiral wound gasket, and the first jacket with a second jacket; forming a first sealing layer on the first jacket through the opening portion of the second jacket; forming a second sealing layer to cover the first sealing layer; and forming a third sealing layer on the second jacket in the opposite side of the second sealing layer.

In addition, the present invention provides a manufacturing method of a gasket characterized in that and includes the steps of: mounting a first C-ring member and a second C-ring member provided with a core spring into the inside of a first jacket; mounting a spiral wound gasket between the first C-ring member and the second C-ring member; forming an internal sealing layer on the spiral wound gasket through the opening portion of the first jacket; encasing the first C-ring member, the second C-ring member, the spiral wound gasket, and the first jacket with a second jacket; forming a external sealing layer to cover the first jacket through the opening portion of the second jacket; and forming a third sealing layer on the second jacket in the opposite side of the second sealing layer.

In addition, a gasket is provided, characterized in that the opening portion of the first C-ring member is formed towards the inside of the gasket, and the opening portion of the second C-ring member is formed towards the inside of the gasket.

In addition, a gasket is provided, characterized in that the opening portion of the first C-ring member is formed towards the outside of the gasket, and the opening portion of the second C-ring member is formed towards the outside of the gasket.

In addition, a gasket is provided, characterized in that the opening portion of the first C-ring member is formed towards the contact surface of the flange wherein the gasket is mounted, and the second C-ring member is formed towards the contact surface of the flange wherein the gasket is mounted.

In addition, a gasket is provided, characterized in that the first core spring is a flat coil spring, and the second core spring is a flat coil spring.

In addition, a gasket is provided, characterized in that the spiral wound gasket is formed by winding the hoop and the filler alternately and repeatedly, and the hoop is formed in the shape of an inverted "W" comprising two peaks and one valley, and the two peaks of the hoop are directing towards the outside of the gasket.

In addition, a gasket is provided, characterized in that the filler is formed with any one of carbon, ceramics, and mica, or formed with a combination of these elements. That is the filler can be made of a non-asbestos material.

In addition, a gasket is provided, characterized in that the first sealing layer, the second sealing layer, and the third sealing layer are formed with any one of carbon, mica, polytetrafluoroethylene (PTFE), silver, and atomized stainless steel, or a combination of these elements.

In addition, a gasket is provided, characterized in that the internal sealing layer, the external sealing layer, and the third sealing layer are formed with any one of carbon, mica, polytetrafluoroethylene, silver, and atomized stainless steel, or a combination of these elements.

DETAILED DESCRIPTION OF EMBODIMENTS

Figure 1:
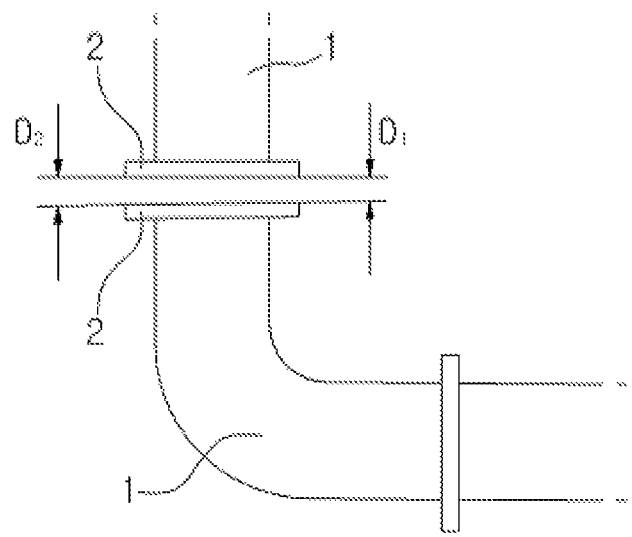
FIG. 1 is a view illustrating the flanges provided with a gasket therebetween and unevenly widened (separated).
Figure 2:
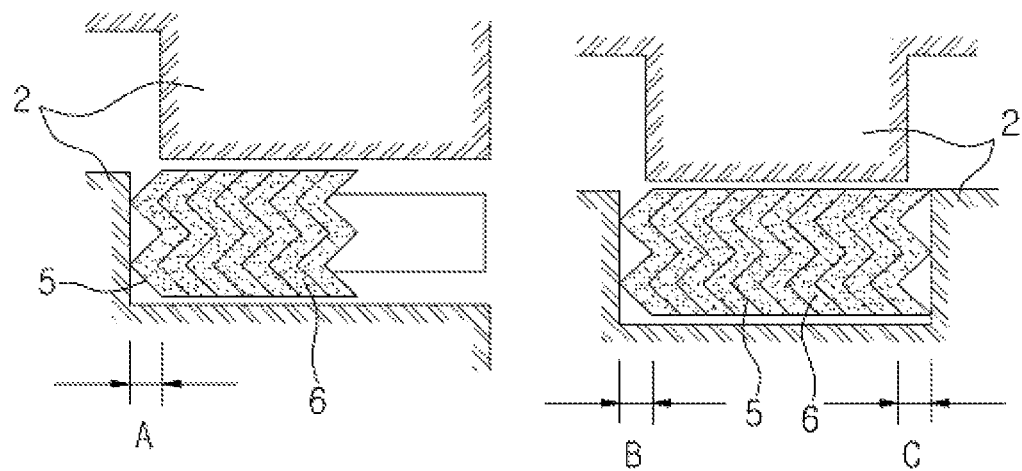
FIG. 2 is a view illustrating the occurrence of gaps between the contact surfaces of the flanges.

Hereinafter, exemplary embodiments of the present invention will be described in detail with reference to the accompanying drawings. Since various changes can be applied to the present invention which may also have a variety of forms, specific exemplary embodiments shall be illustrated in the drawings as examples and described in detail in the text. However, it is not intended to limit the present invention to the specific forms disclosed herein, but it should be understood to include all modifications, equivalents and substitutes included in the spirit and scope of the present invention.

Figure 3:
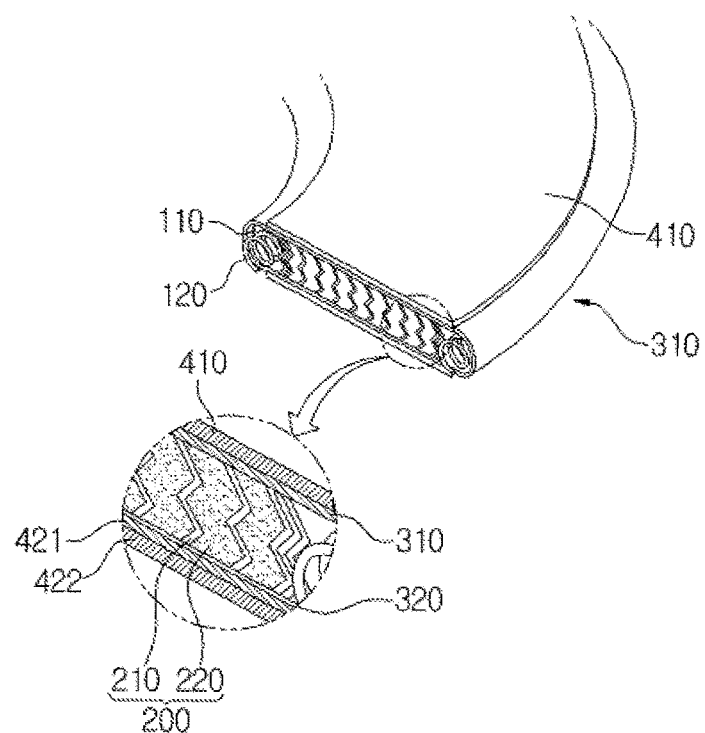
FIG. 3 is a view illustrating a gasket according to the first exemplary embodiment of the present invention.

FIG. 3 is a view illustrating a gasket according to the first exemplary embodiment of the present invention.

Gaskets of the exemplary embodiments of the present invention may have the shape of a ring in overall as shown in FIG. 3, however, they are not limited to this but may be implemented in various forms such as oval, oblong square, diamond, and the like as necessary.

A gasket according to the first exemplary embodiment of the present invention may comprise a spiral wound gasket 200, two O-ring members 110, a plurality of core springs 120, a first jacket 320, a second jacket 310, a first sealing layer 421, a second sealing layer 422, and a third sealing layer 410.

The O-ring members 110 may be disposed in the internal side and the external side of the spiral wound gasket 200. Among the two O-ring members 110, the one located close to the fluid path of the pipe flange will be referred to as a first O-ring member, and the other one located in the outer side of the spiral wound gasket 200 will be referred to as a second O-ring member. Besides, a core spring 120 may be provided inside the O-ring member 110.

Such a spiral wound gasket 200, a first O-ring member, a second O-ring member may be accommodated inside the first jacket 320, and the spiral wound gasket 200, the first O-ring member, the second O-ring member, and the first jacket 320 may be accommodated inside the second jacket.

And, a first sealing layer 421 may be formed on the first jacket 320 accommodated inside the second jacket 310, and a second sealing layer 422 may be formed on the first sealing layer 421. And, a third sealing layer 410 may be formed on the second jacket 310 which is in the opposite side of the second sealing layer 422.

Figure 4:
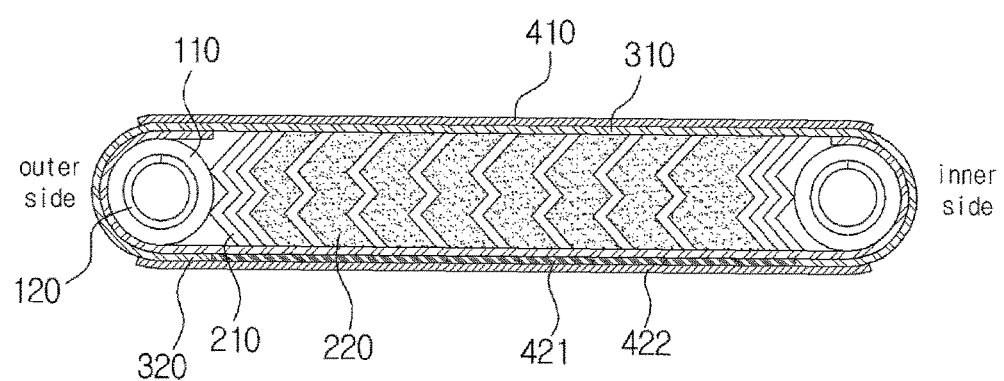
FIG. 4 is an enlarged view of the cross-section of the previous gasket according to the first exemplary embodiment of the present invention.

FIG. 4 is an enlarged view of the cross-section of the previous gasket according to the first exemplary embodiment of the present invention.

The spiral wound gasket 200 according to the first exemplary embodiment of the present invention may be produced by winding the hoops 210 and fillers 220 alternately and repeatedly in a spiral form. However, the hoops 210 and fillers 220 are not necessarily wound alternately and repeatedly in order, more hoops 210 are wound in the outer portion or in the inner portion of the spiral wound gasket 200 in various way that the stiffening force is more reinforced. That is, more hoops 210 are wound in the outer portion or in the inner portion than in the middle portion of the spiral wound gasket 200, thereby preventing the fillers 220 from leaking towards the outside.

The hoop 210 of the spiral wound gasket 200 used in the present invention may be manufactured in a metal strip having a cross-section of a zigzag form and an elastic property, and as can be seen in FIG. 4, in the form of an inverted 'W' having two peaks and one valley therein. Besides, the two peaks of the hoop 210 are formed to face the outward direction of the gasket so that when the fluid is leaking out from the pipe path of the flange, the additional leakage is prevented due to the widening of the hoop 210 by the fluid pressure.

Furthermore, the hoop 210 of the spiral wound gasket 200 according to the first exemplary embodiment of the present invention may be formed to be the shape of an inverted 'W' by forming three bended portions therein. There is an effect in that since such a 'W' shaped hoop has three bended portions therein, the pressure applied from the outside of the gasket is uniformly distributed and applied to the areas of each bended portions and prevent the hoops 210 from losing the restoring force thereof by yielding to the external pressure.

Although the filler 220 of the spiral wound gasket 200 of the gasket of the present invention may be formed with carbon, but not limited to this and may be formed with any one of carbon, ceramics, and mica, or formed with a combination of these elements. That is the filler can be made of a non-asbestos material.

The O-ring members 110 provided in the inner side and the outer side of the spiral wound gasket 200 of the gasket according to the first exemplary embodiment of the present invention is formed with a metal and may perform the role of preventing the deformation along the radius direction of the spiral wound gasket 200. Since such O-ring member 110 may be manufactured with a metal, it may be referred to as a metal tube O-ring. The core spring 120 provided inside such O-ring member 110 may perform the role of reinforcing the restoring force of the O-ring member 110.

The first jacket 320 of the first exemplary embodiment of the present invention may comprise a metal and accommodate inside thereof the spiral wound gasket 200, the first O-ring member, and the second O-ring member through the opening portion thereof. The second jacket 310, located in the opposite side of the first jacket 320, may accommodate inside thereof the spiral wound gasket 200, the first O-ring member, the second O-ring member, and the first jacket 320 through the opening portion.

That is, since the gasket according to the first exemplary embodiment of the present invention encases the spiral wound gasket 200 with the first jacket 320 and the second jacket 310, leaking of the hoops 210 or the fillers 220 of the spiral wound gasket 200 towards the outside can be prevented. In addition, an effect can be achieved in that the restoring force of the gasket is enhanced due to the O-ring members 110 provided inside the first jacket 320 and the second jacket 310.

A first sealing layer 421 may be formed on the first jacket 320 which is being exposed through the opening portion of the second jacket 310 according to the first exemplary embodiment of the present invention. And, since such first sealing layer 421 is formed to have about the thickness of the first jacket 320, there is an effect in that the height difference, formed when the first jacket 320 is encased by the second jacket 310, is filled thereby. And, a second sealing layer 422 may be formed on such first sealing layer 421 so as to fully cover the first sealing layer 421, and a third sealing layer 410 may be formed on the second jacket 310 located in the opposite side of the second sealing layer 422. And, it may be configured that the internal density of the first sealing layer 421 is higher than that of the second sealing layer 422. That is, the first sealing layer 421 may be formed to be more hard and dense compared to the second sealing layer 422 even when they are comprised of the same material such as carbon and the like.

Thus, according a gasket according to the first exemplary embodiment of the present invention the height difference formed between the first jacket 320 and the second jacket 310 can be easily removed by the first sealing layer 421 comprising carbon and the like, so that the pressure can be uniformly applied to the inside of the gasket due to the first sealing layer 421. In addition, there is an effect in that the heights of the upper surface and the lower surface of the gasket are smoothly maintained at the equal height owing to the second sealing layer 422 and the third sealing layer 410, and the tightness of the contact with the bonding surfaces of the flanges can be enhanced further.

Figure 5:
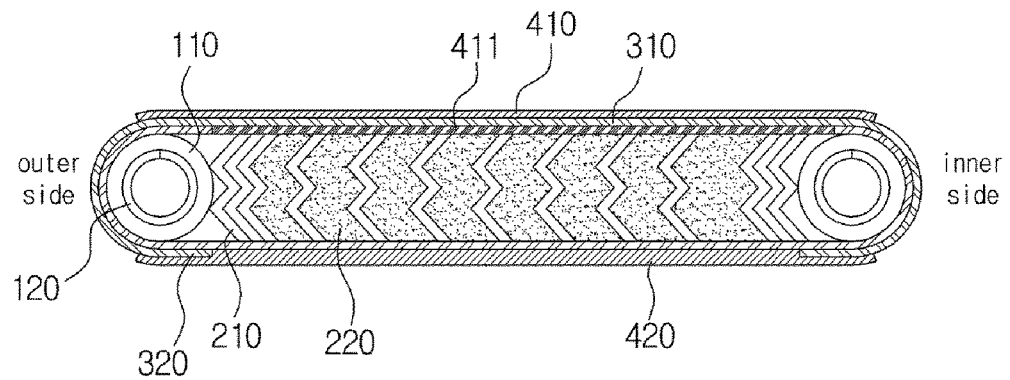
FIG. 5 is a cross-sectional view of a gasket according to the second exemplary embodiment of the present invention.

FIG. 5 is a cross-sectional view of a gasket according to the second exemplary embodiment of the present invention.

In a gasket according to the second exemplary embodiment of the present invention, the spiral wound gasket 200, the first O-ring member, and the second O-ring member may be accommodated inside the first jacket 320 through the opening portion of the first jacket 320.

And, an internal sealing layer 411 may be formed above the spiral wound gasket 200 which is accommodated inside the first jacket 320. The internal sealing layer 411 may be formed with carbon material, but not limited to this. Preferably, the internal sealing layer 411 may be formed with a material comprising any one of carbon, mica, and ceramics, or a combination of these.

The second jacket 310 of the gasket according to the second exemplary embodiment of the present invention, may be formed encasing the spiral wound gasket 200, the first O-ring member, the second O-ring member, and the internal sealing layer 411.

In this process, the internal sealing layer 411 inside the second jacket 310 may performed the role of assisting the second jacket 310 so that it may smoothly encase the first jacket 320, and at the same time, when adopted to the flange, it may perform the role of delivering the pressure equally to each portions in the spiral wound gasket 200.

An external sealing layer 420 may be formed above the surface of the first jacket 320 being exposed through the opening portion of the second jacket 310, and the external sealing layer 420 may be formed to cover the entire surface of the exposed first jacket. And, a third sealing layer 410 may be formed above the second jacket 310 located in the opposite side of the external sealing layer 420.

Thus, eventually, the upper surface and the lower surface of the gasket may be equally formed to have same height, there is an effect in that the concern about damage to the gasket due to pinpoint loading of the pressure thereon may be reduced. Besides, since the external sealing layer 420 comprising carbon and the like may be deposited on the first jacket 320 in one time process, there is an effect in that the manufacturing process becomes simple so that the manufacturing cost can be reduced thereby.

Figure 6:
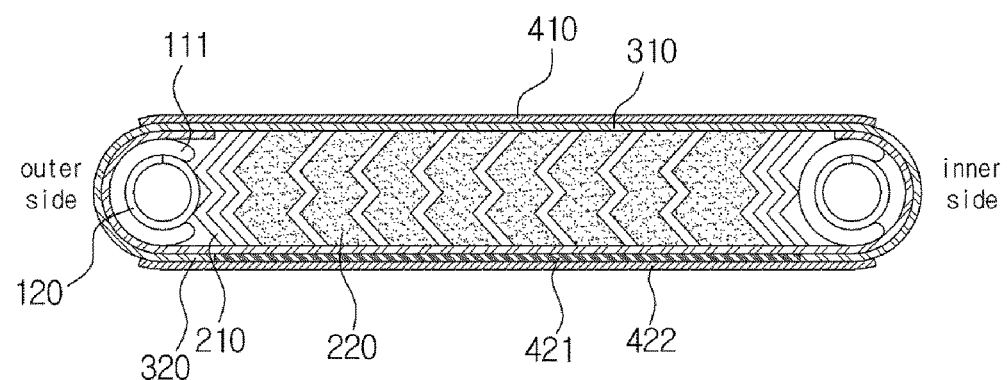
FIG. 6 is a cross-sectional view of a gasket according to the third exemplary embodiment of the present invention.

FIG. 6 is a cross-sectional view of a gasket according to the third exemplary embodiment of the present invention.

The gasket according to the third exemplary embodiment of the present invention may be manufactured similarly to the gasket according to the first exemplary embodiment, however, it can be manufactured by replacing the O-ring member 110 with a C-ring member 111.

The C-ring member 111 according to the third exemplary embodiment of the present invention is formed with an opening portion in one side of the O-ring member 110 and has a cross-section of letter 'C', and the opening portion of the C-ring member 111 of the gasket according to the third exemplary embodiment of the present invention may be formed facing towards the inside of the gasket.

Therefore, there is an effect in that the additional leakage of the fluid can be prevented due to the expansion of the opening portion of the C-ring member 111 when the fluid is leaking from the fluid path of the tube flange. Furthermore, there is an effect in that the separation of the spiral wound gasket 200 along the radial direction of the gasket can be prevented.

Figure 7:
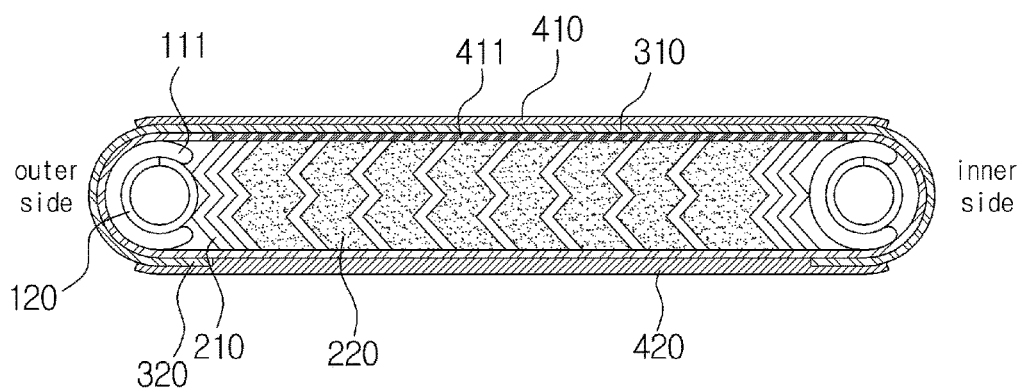
FIG. 7 is a cross-sectional view of a gasket according to the fourth exemplary embodiment of the present invention.

FIG. 7 is a cross-sectional view of a gasket according to the fourth exemplary embodiment of the present invention.

The gasket according to the fourth exemplary embodiment of the present invention may be manufactured by replacing the O-ring member 110 of the gasket according the second exemplary embodiment with a C-ring member 111.

The gasket according to the fourth exemplary embodiment of the present invention, similar to the gasket according to the third exemplary embodiment which is reviewed previously, has an effect in that leaking of the fluid from the fluid path of the flange can be prevented and at the same time separation of the hoops or the fillers of the spiral wound gasket 200 along the radial direction can be prevented owing to the C-ring members 111 provided in the inside and the outside of the spiral wound gasket 200.

In the gasket according to the fourth exemplary embodiment of the present invention, an internal sealing layer 411 may be formed on the spiral wound gasket 200 which is being accommodated inside the first jacket. And, the second jacket 310 covers this (internal sealing layer 411) and may accommodate the spiral wound gasket 200, the first C-ring member, the second C-ring member, and the internal sealing layer 411 inside the second jacket 310.

Thus, there is an effect in that since the spiral wound gasket 200 can keep in close contact with the second jacket 310 without any separation gap owing to the internal sealing layer 411, the pressure being applied to the spiral wound gasket 200 can be equally distributed.

The surface of the first jacket 320 being externally exposed through the opening portion of the second jacket 310 may be completely covered by the external sealing layer 420. And, a third sealing layer 410 may be formed on the second jacket 310 located in the opposite side of the external sealing layer 420.

Thus, there is an effect in the gasket according to the fourth exemplary embodiment of the present invention that the damage to the gasket can be minimized since each portions of the gasket can be applied with equal pressure from both joint surfaces of the flanges.

Figure 8:
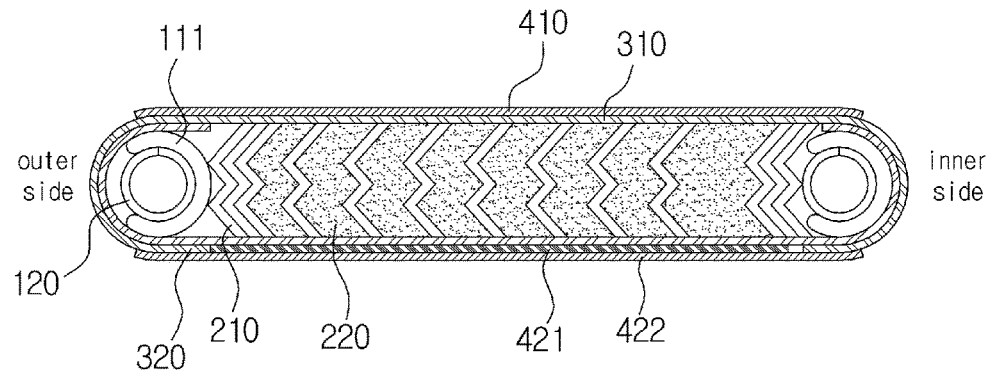
FIG. 8 is a cross-sectional view of a gasket according to the fifth exemplary embodiment of the present invention.

FIG. 8 is a cross-sectional view of a gasket according to the fifth exemplary embodiment of the present invention.

The C-ring member 111 according to the fifth exemplary embodiment of the present invention is characterized in that the directions (of the opening portions of the C-ring members) are facing towards the outer side of the gasket instead of the inner side in the gasket according to the third exemplary embodiment.

The gasket according to the fifth exemplary embodiment of the present invention has an effect in that since the C-ring member 111 is facing towards the outside of the gasket the C-ring member is expanded when a non-ideal pressure is applied from the outside of the flange, the pipe path inside the flanges is prevented from being affected by the external pressure. Besides, there is an effect in that when the fluid is being flowed into the inside of the gasket, the opening portion of the C-ring member 111 is expanded as well as the spiral wound gasket 200 inside thereof so that the gasket is in contact with the joint surfaces of the flanges more tightly, thereby enhancing the sealing effect.

Figure 9:
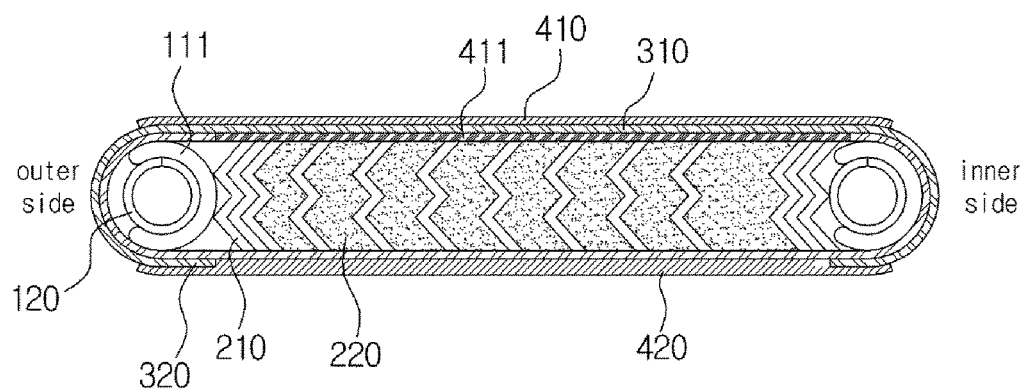
FIG. 9 is a cross-sectional view of a gasket according to the sixth exemplary embodiment of the present invention.

FIG. 9 is a cross-sectional view of a gasket according to the sixth exemplary embodiment of the present invention.

The gasket according to the sixth exemplary embodiment of the present invention is characterized in that the directions (of the opening portions) of the C-ring members 111 in the gasket according to the fourth exemplary embodiment are being changed to face towards the outer side of the gasket.

The gasket according to the sixth exemplary embodiment of the present invention, like the gasket according to the fifth exemplary embodiment, can also prevent the pipe path inside the flanges from being affected owing to the expansion of the second C-ring member located in the outside of the spiral wound gasket 200 when a non-ideal pressure flowed in from the outside of the flange.

And, there is an effect in that when the fluid is being flowed into the inside of the first gasket 320 of the gasket, the spiral wound gasket 200 inside thereof and the C-ring member 111 are expanded simultaneously so that the gasket is in contact with the joint surfaces of the flanges more tightly, thereby enhancing the sealing effect.

Figure 10:
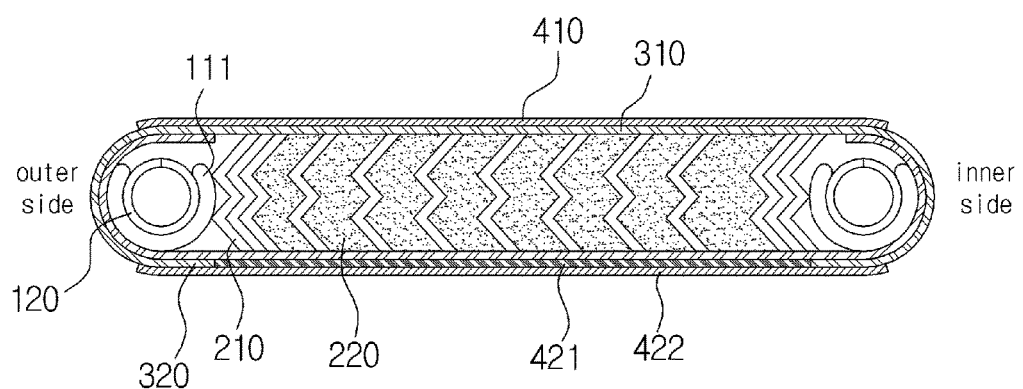
FIG. 10 is a cross-sectional view of a gasket according to the seventh exemplary embodiment of the present invention.
Figure 11:
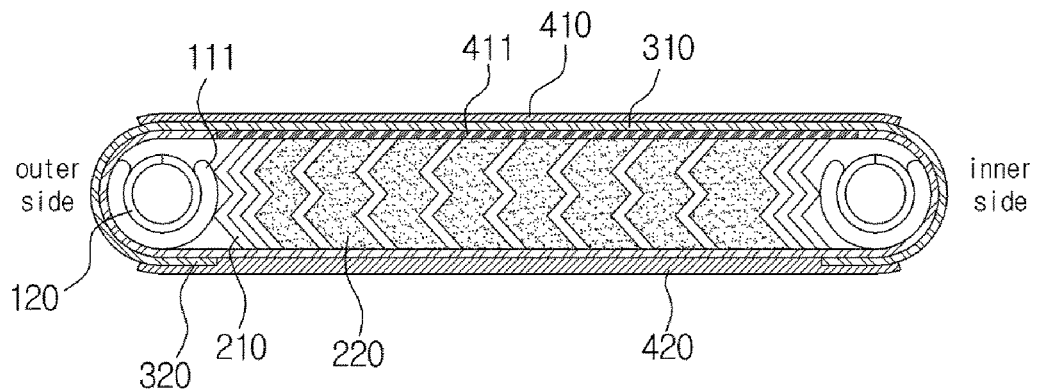
FIG. 11 is a cross-sectional view of a gasket according to the eighth exemplary embodiment of the present invention.

FIGS. 10 and 11 are the views of the gaskets according to the seventh and the eighth exemplary embodiments of the present invention respectively.

The opening portions of the C-ring members 111 of the gaskets according to the seventh and the eighth exemplary embodiments of the present invention may be formed to face upward direction.

In this way, the C-ring members 111 of the gasket according to the seventh and the eighth exemplary embodiments of the present invention are facing upward direction, so that the hoops 210 of the spiral wound gasket 200 can be pushed more firmly from both sides.

More specifically, when the fluid is being leaked out from the pipe path and flowed into the inside of the first jacket 320 and the second jacket 310 of the gasket, the C-ring members 111 of the gasket are being expanded along the left-and-right direction. That is, the first C-ring member located at the inner side of the spiral wound gasket 200 and the second C-ring member located at the outer side of the spiral wound gasket 200 are being expanded so as to push the spiral wound gasket 200 from both sides. Thus, the hoops 210 of the spiral wound gasket 200 is being widened so that it (the gasket) can be in contact with the contact surfaces of the flanges more firmly.

Thus, the gaskets according to the seventh and the eighth exemplary embodiments of the present invention have an effect in that the sealing effect of the contact surfaces of the pipe path of the flanges is maintained more firmly.

Figure 12:
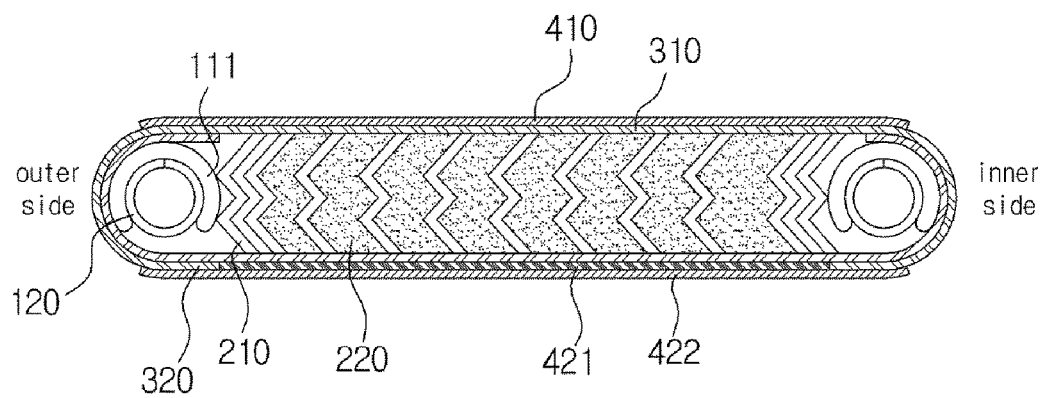
FIG. 12 is a cross-sectional view of a gasket according to the ninth exemplary embodiment of the present invention.
Figure 13:
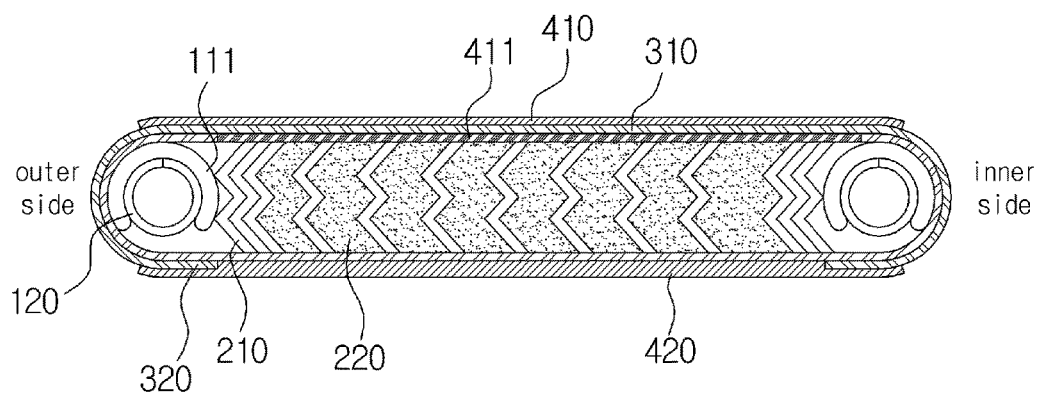
FIG. 13 is a cross-sectional view of a gasket according to the tenth exemplary embodiment of the present invention.

FIGS. 12 and 13 are the views of cross-sections of the gaskets according to the ninth and the tenth exemplary embodiments of the present invention.

The C-ring member 111 of the gasket according to the ninth and the tenth exemplary embodiments of the present invention is directing downward direction of the flange as illustrated in the drawings, so that the gaskets may look different than the gaskets according to the seventh and the eighth exemplary embodiments of the present invention, however, the gaskets of the ninth and the tenth exemplary embodiments have same structures as the gaskets of the seventh and the eighth exemplary embodiments that are being symmetrically flipped upside down.

Thus, the gaskets of the ninth and the tenth exemplary embodiments are not different from the gaskets of the seventh and the eighth exemplary embodiments, in the same way, there is an effect in that when the fluid is being flowed into the inside the gasket the C-ring members 111 are expanded so that the spiral wound gasket 200 is being pushed simultaneously from the inner side and the outer side so as to widen the hoops, thereby further enhancing the sealing effect of the contact surfaces of the flanges.

Figure 14:
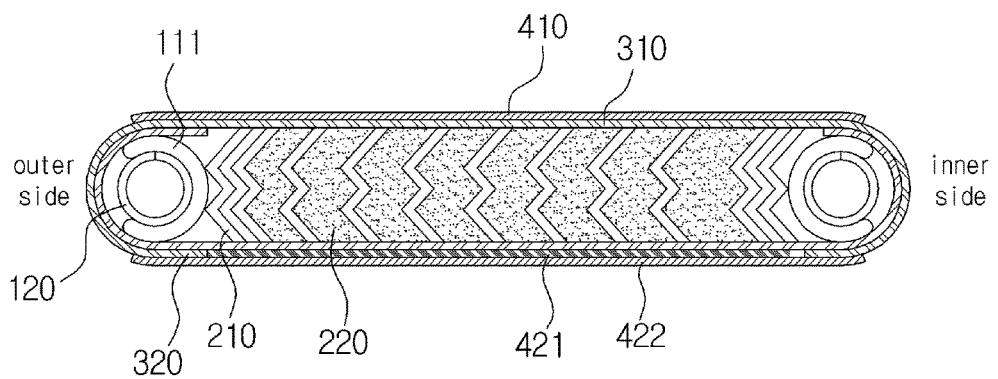
FIG. 14 is a cross-sectional view of a gasket according to the eleventh exemplary embodiment of the present invention.
Figure 15:
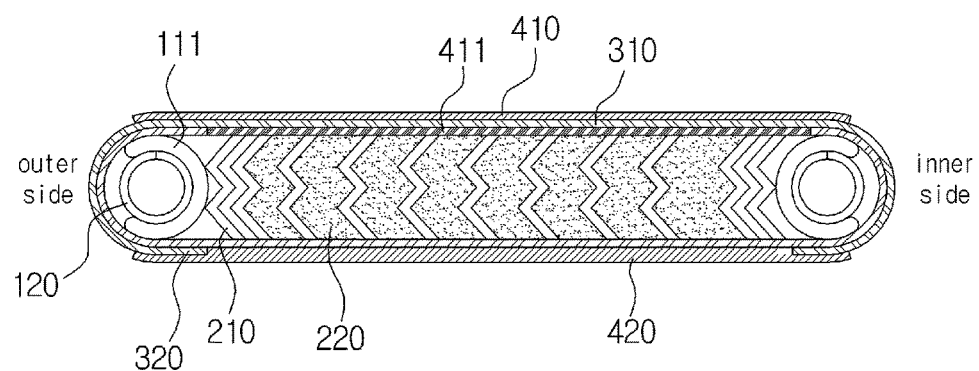
FIG. 15 is a cross-sectional view of a gasket according to the twelfth exemplary embodiment of the present invention.

FIGS. 14 and 15 are views illustrating the cross-sections of the gaskets according to the eleventh and the twelfth exemplary embodiments of the present invention.

Each of the gaskets according to the eleventh and the twelfth exemplary embodiments of the present invention is characterized in that the opening portion of the second C-ring member 111 of the gaskets, which is located in the outer portion of the spiral wound gasket 200 according to the third and the fourth exemplary embodiments, is directing towards the outside.

The gaskets according to the eleventh and the twelfth exemplary embodiment of the present invention have an effect in that since the opening portion of the first C-ring member located in the inner portion of the spiral wound gasket 200 is facing towards the inside of the gasket, and the opening portion of the second C-ring member located in the outer portion of the spiral wound gasket 200 is facing towards the outside of the gasket, so that the first C-ring member is being expanded and seals the joint surface for the fluid being leaked out from the pipe path of the flange, and the second C-ring member is being expanded and seals the joint surface firmly for the fluid flowing in from the outside of the flange.

Figure 16:
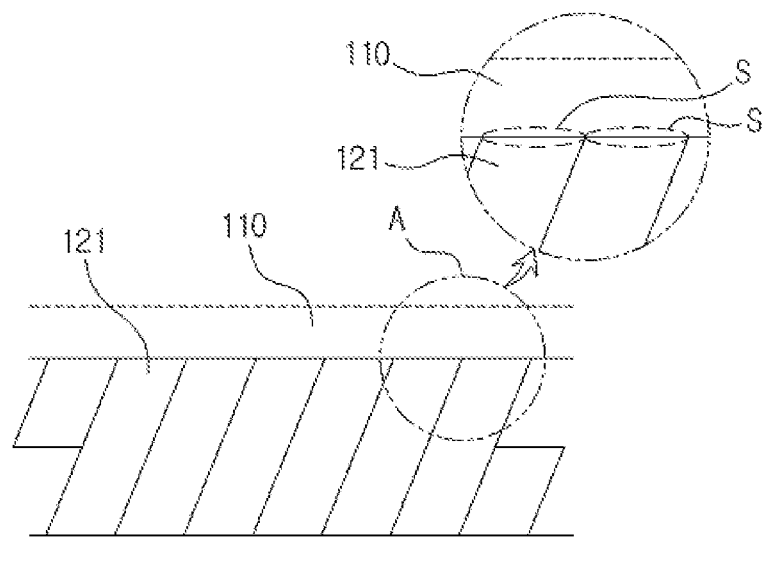
FIG. 16 is a view illustrating an example of a core spring adopted to each of the exemplary embodiment of the present invention.

FIG. 16 is a view illustrating an example of a core spring adopted to each of the exemplary embodiment of the present invention.

The core spring 120 being adopted to the O-ring member 110 or the C-ring member 111 of the exemplary embodiment of the present invention may be a spring manufactured in the form of a flat coil spring 121 which is formed by winding a long plate.

Figure 17:
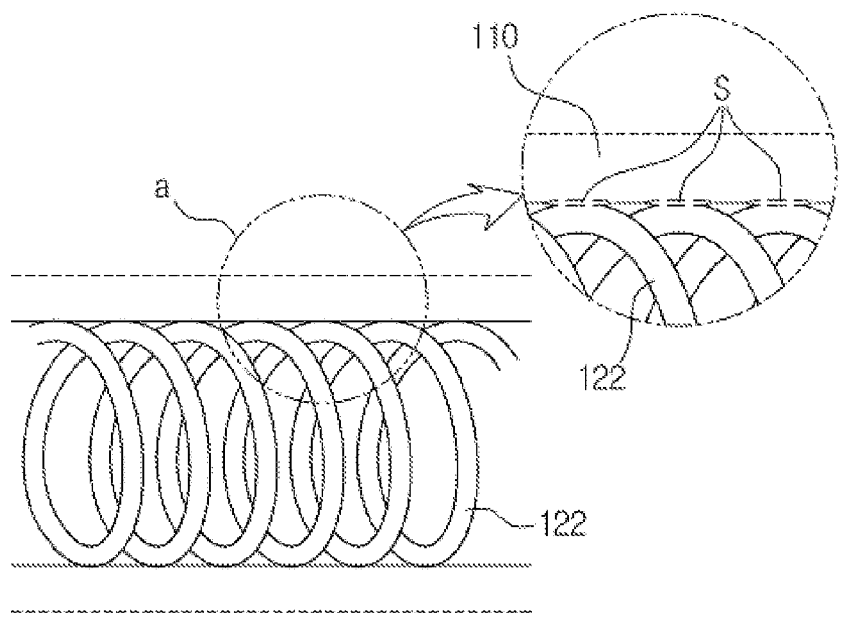
FIG. 17 is a perspective view illustrating a conventional coil spring.

Generally, the coil spring 122 can be manufactured by winding a long metal material along the direction of the coil as seen in FIG. 17.

However, when a common coil spring 122 is inserted into the O-ring member 110 or a C-ring member 111, the area 'S' which is the contact area between the coil spring 122 and the O-ring member 110 or the C-ring member 111 must be a very narrow area as shown in the exploded view in FIG. 17. That is, since the contact area between the coil spring 122, which is inserted for reinforcing the restoring force of the O-ring member 110 or the C-ring member 111, and the O-ring member 110 or the C-ring member 111 is small, there is a concern that the O-ring member 110 or the C-ring member 111 may easily damaged since a high pressure is directly applied to the narrow area when an external pressure is applied thereto.

Therefore, a flat coil spring 121 which is formed by winding a long plate can be used as a core spring 120 according to each exemplary embodiment of the present invention.

When the core spring 120 is replaced by a flat coil spring 121 the contact area 'S' between the flat coil spring 121 and the O-ring member 110 or the C-ring member 111 can be maintained to be wider, as can be seen in FIG. 16. That is, since a very large contact area compared to the 'S' in FIG. 17 can be maintained, the pressure can be uniformly distributed even when a pressure is applied to the O-ring member 110 or the C-ring member 111.

Thus, there is an effect in that the possibility of damaging the O-ring member 110 or the C-ring member 111 can be reduced further.

Figure 18:
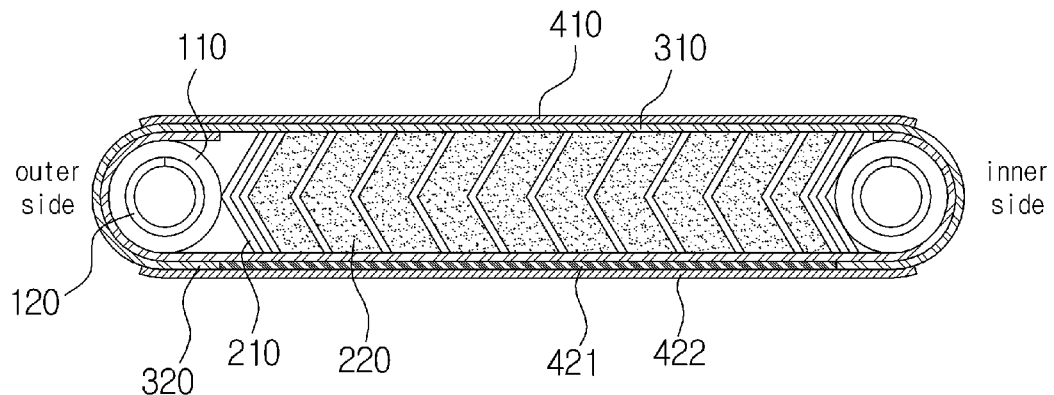
FIG. 18 is a cross-sectional view of a gasket according to the thirteenth exemplary embodiment of the present invention.

FIG. 18 is a cross-sectional view of a gasket according to the thirteenth exemplary embodiment of the present invention.

The gasket according to the thirteenth exemplary embodiment of the present invention is characterized in that the hoops 210 of the spiral wound gasket 200 in the gasket according to the first exemplary embodiment is formed to be the shape of the letter 'V'.

The hoops 210 being shaped to be the letter 'V' according to the thirteenth exemplary embodiment of the present invention can be manufactured with a one-time bending process. That is, the manufacturing process for the hoops 210 having the shape of the letter 'W' is rather complicated since a three-time bending process is required as previously reviewed, however, the gasket according to the thirteenth exemplary embodiment of the present invention has an effect in that the manufacturing cost thereof can be reduced since only one-time process is sufficient to make a 'V' shaped hoops 210.

Thus, the 'V' shaped hoops 210 has a disadvantage in that the breakdown may easily occur compared to the 'W' shaped hoops 210 since the pressure is focused on the only one bended portion thereof, however, there is an effect in that the gaskets being adopted to the joint surfaces of the relatively lower pressure flange pipes can be provided with a lower price since the manufacturing process thereof is simple.

Figure 19:
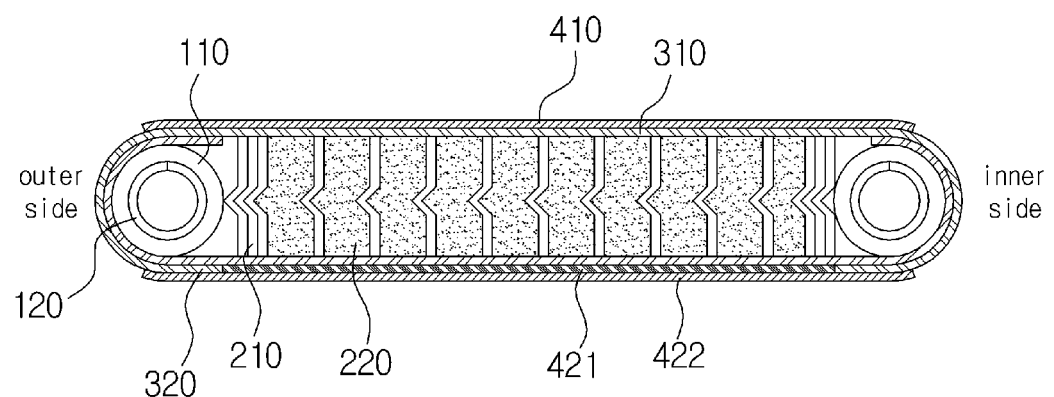
FIG. 19 is a cross-sectional view of a gasket according to the fourteenth exemplary embodiment of the present invention.

FIG. 19 is a cross-sectional view of a gasket according to the fourteenth exemplary embodiment of the present invention.

The gasket according to the fourteenth exemplary embodiment of the present invention is characterized in that the hoops 210 of the spiral wound gasket 200 in the gasket according to the first exemplary embodiment is manufactured to be the shape of a plate provided with a protruded portion.

In the fourteenth exemplary embodiment of the present invention, the protruded portion of the hoops 210 of the spiral wound gasket 200 may direct towards the outer side direction of the gasket.

Besides, when a pressure is applied from the outside of the flanges, the protruded portion and the second O-ring member is being pressed so that the hoops of the gasket may be expanded due to such protruded portion. In addition, the first O-ring member which is located in the opposite side can be pressed together with the recessed portion of the hoop. Thus, there is an effect in that when a pressure is being applied from the outside or the inside of the gasket the hoops of the spiral wound gasket are being widened so that the leaking out of the fluid inside the flange pipe path towards the outside can be prevented. In addition, the gasket according to the fourteenth exemplary embodiment of the present invention has an additional effect in that since there are three bended portions compared to the 'V' shaped hoops 210, the pressure is distributed to a certain degree.

Figure 20:
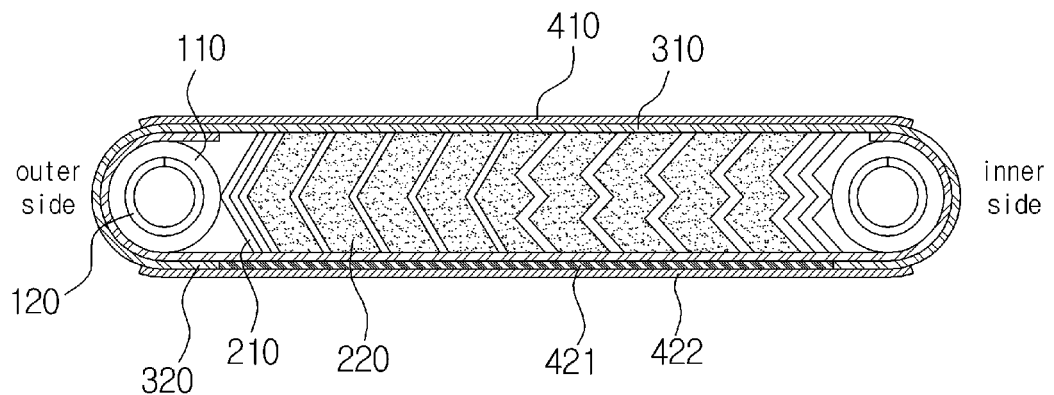
FIG. 20 is a cross-sectional view of a gasket according to the fifteenth exemplary embodiment of the present invention.

FIG. 20 is a cross-sectional view of a gasket according to the fifteenth exemplary embodiment of the present invention.

The gasket according to the fifteenth exemplary embodiment of the present invention may be the gasket according to the first exemplary embodiment wherein the shapes of the hoops 210 of the spiral wound gasket 200 are mixedly used with the shapes of the letter 'V' and the letter 'W'.

More specifically, the shape of the hoop 210 located in the outer side of the spiral wound gasket 200 of the gasket according to the fourteenth exemplary embodiment of the present invention may be formed to be the shape of the letter 'V', and the hoop 210 located in the inner portion may be formed to be the shape of the letter 'W'.

As previously reviewed, there is an effect in that the pressure applied to the hoop 210 can be distributed due to the two bended portion in the 'W' shaped hoop 210 so that the breakdown of the hoop 210 can be prevented when a high pressure is applied thereto. Besides, there is only one bended portion in the 'V' shaped hoop 210 so that it may breakdown more easily since the pressure is focused on that bended portion, however, there is an effect in that the manufacturing process thereof becomes simple.

Thus, in the gasket according to the fifteenth exemplary embodiment of the present invention, the 'V' shaped hoops 210 are located in the outer portion of the gasket, and the 'W' shaped hoops 210 are located in the inner portion of the gasket, accordingly, the restoring force of the inner portion where the relatively stronger pressure is being applied is covered by the 'W' shaped hoops, and that of the outer portion is covered by the 'V' shaped hoops, so that the restoring force of the gasket can be enhanced, and an additional effect of reducing the manufacturing cost thereof can be achieved as well.

Figure 21:
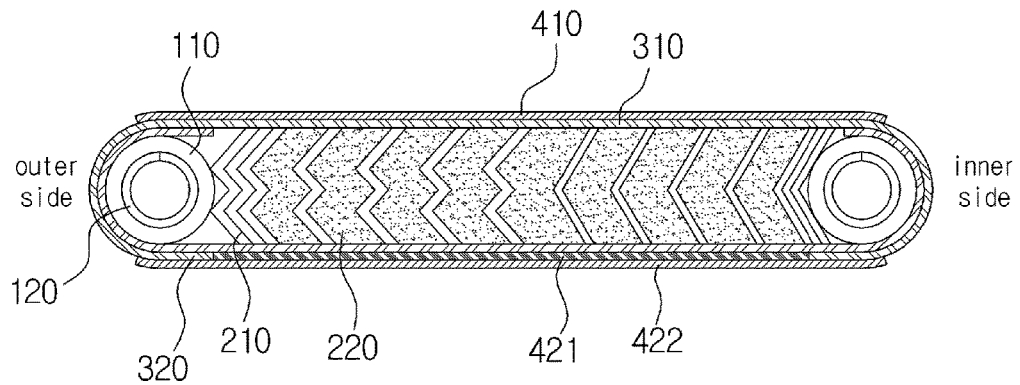
FIG. 21 is a cross-sectional view of a gasket according to the sixteenth exemplary embodiment of the present invention.

FIG. 21 is a cross-sectional view of a gasket according to the sixteenth exemplary embodiment of the present invention.

The gasket according to the sixteenth exemplary embodiment of the present invention is characterized in that the locations of the 'W' shaped hoops and the 'V' shaped hoops of the spiral wound gasket 200 in the gasket according to the fifteenth exemplary embodiment is interchanged to each other. That is, 'W' shaped hoops are located in the outer portion of the gasket, and the 'V' shaped hoops are located in the inner portion of the gasket.

Therefore, the gasket according to the sixteenth exemplary embodiment of the present invention can be used for the specific structure manufactured in a way that more strong pressure is applied to the outer portion of the joint surface of the flange than the inner portion thereof.

Figure 22:
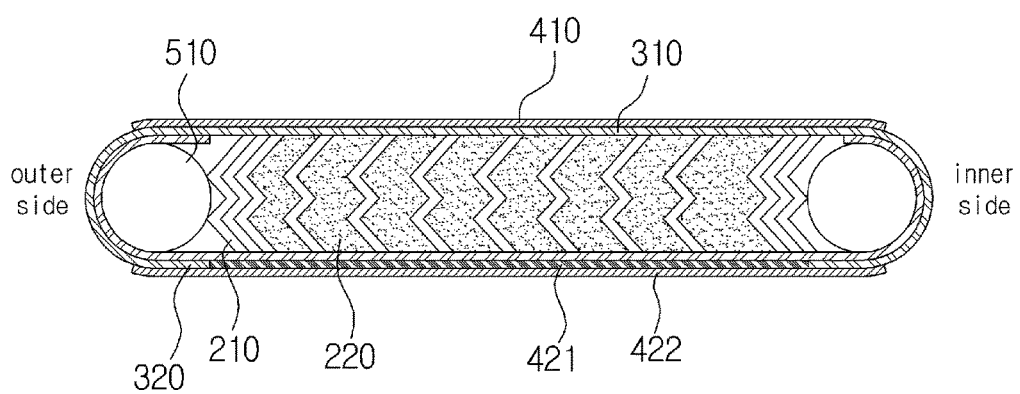
FIG. 22 is a cross-sectional view of a gasket according to the seventeenth exemplary embodiment of the present invention.

FIG. 22 is a cross-sectional view of a gasket according to the seventeenth exemplary embodiment of the present invention.

The gasket according to the seventeenth exemplary embodiment of the present invention is characterized in that the O-ring members 110 in the gasket according to the first exemplary embodiment are replaced by the simple ring members 510 whose inside is filled.

Thus, the gasket according to the seventeenth exemplary embodiment of the present invention has an effect in that the manufacturing process can be further simplified by replacing the O-ring members 110, which are provided with the core springs 120, with the simple ring members 510. That is, the restoring force of the gasket may be not sufficient when compared to the O-ring members provided with the core springs 120, however, they can be adopted and used for a case wherein a sufficient restoring force can be provided with the ring members 510 for the gaskets adopted to the flanges being used under a relatively low pressure.

Figure 23:
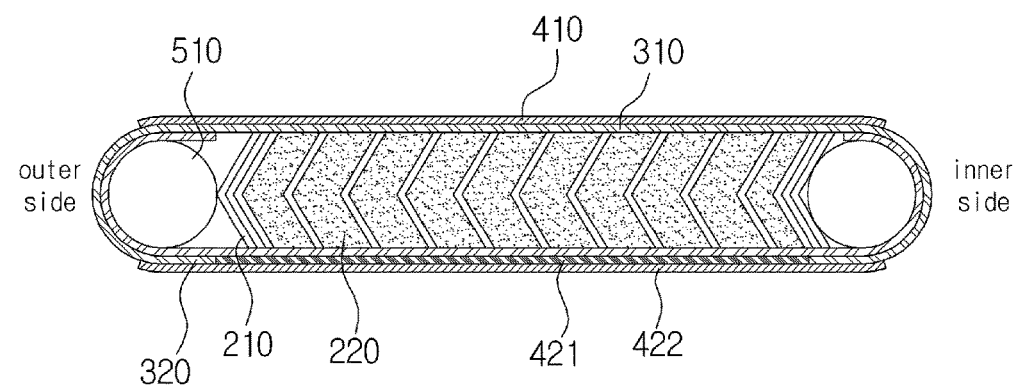
FIG. 23 is a cross-sectional view of a gasket according to the eighteenth exemplary embodiment of the present invention.

FIG. 23 is a cross-sectional view of a gasket according to the eighteenth exemplary embodiment of the present invention.

The gasket according to the eighteenth exemplary embodiment of the present invention is characterized in that the hoops 210 of the spiral wound gasket 200 are replaced by the 'V' shaped hoops in the gasket according to the seventeenth exemplary embodiment.

Thus, there is an effect in that the manufacturing process of the spiral wound gasket 200 can be simplified so that the manufacturing cost can be reduced.

Figure 24:
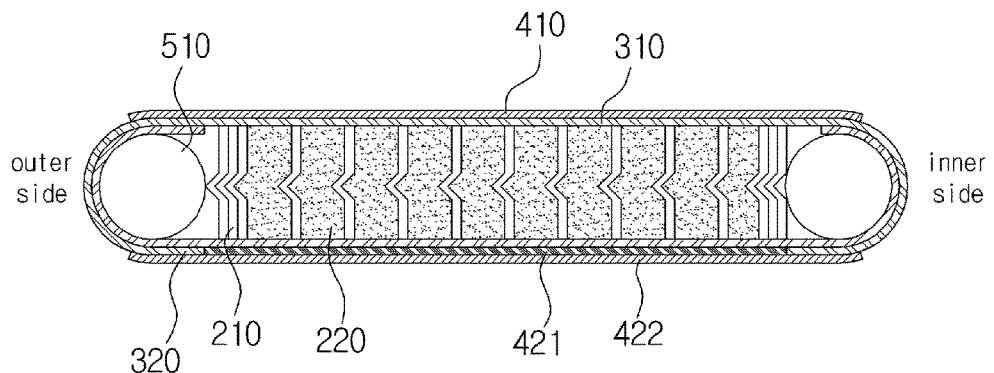
FIG. 24 is a cross-sectional view of a gasket according to the nineteenth exemplary embodiment of the present invention.

FIG. 24 is a cross-sectional view of a gasket according to the nineteenth exemplary embodiment of the present invention.

The gasket according to the nineteenth exemplary embodiment of the present invention is characterized in that the hoops 210 of the spiral wound gasket 200 in the gasket according to the seventeenth exemplary embodiment are replaced by the plate shaped members provided with a protruded portions. Due to this, the gasket according to the nineteenth exemplary embodiment has an effect in that the breakdown pressure can be enhanced to a certain degree.

Figure 25:
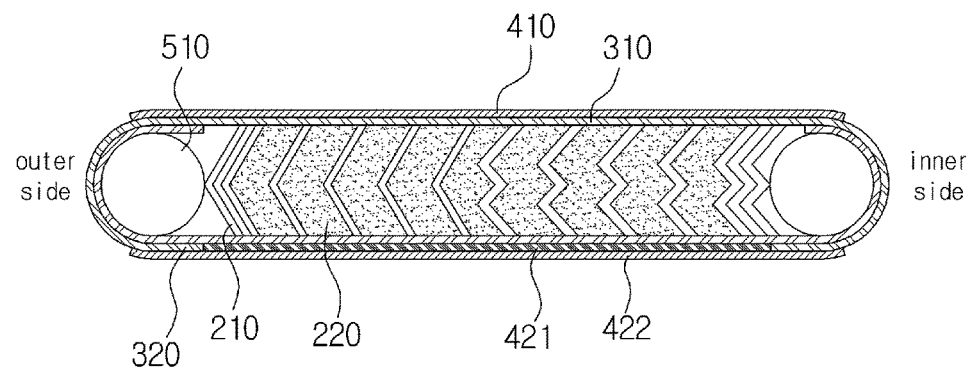
FIG. 25 is a cross-sectional view of a gasket according to the twentieth exemplary embodiment of the present invention.

FIG. 25 is a cross-sectional view of a gasket according to the twentieth exemplary embodiment of the present invention.

The gasket according to the twentieth exemplary embodiment of the present invention is characterized in that the outer side hoops 210 of the spiral wound gasket 200 according to the seventeenth exemplary embodiment are manufactured to be the shape of the letter 'V', and the inner side hoops 210 are manufactured to be the shape of the letter 'W'.

Due to such structure, the gasket according to the twentieth exemplary embodiment of the present invention has effects in that the objective for reinforcing the restoring force which is an effect of 'W' shaped hoops 210 is achieved, and at the same time, the effect of reducing the manufacturing cost is also achieved as well.

Figure 26:
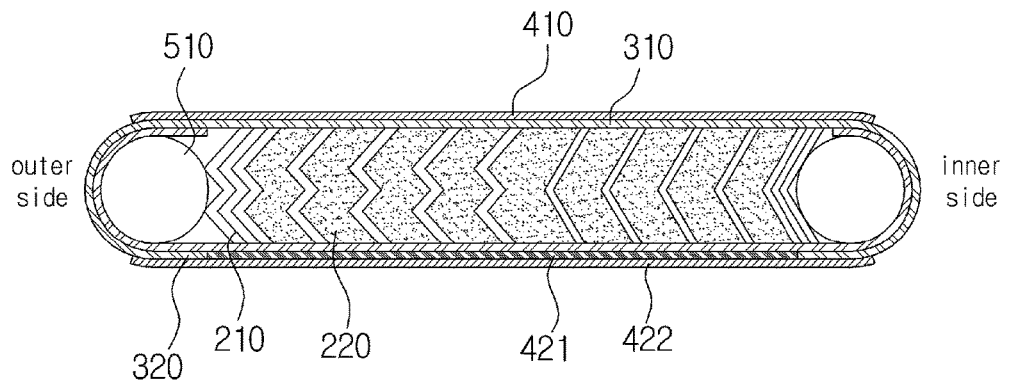
FIG. 26 is a cross-sectional view of a gasket according to the twenty-first exemplary embodiment of the present invention.

FIG. 26 is a cross-sectional view of a gasket according to the twenty-first exemplary embodiment of the present invention.

The gasket according to the twenty-first exemplary embodiment of the present invention is characterized in that the locations of the 'V' shaped hoops and the 'W' shaped hoops of the spiral wound gasket 200 in the gasket according to the twentieth exemplary embodiment are interchanged, and can be used for a specific structure wherein a relatively higher pressure is applied to the outer portion of the joint surface of the flange than the inner portion thereof.

Figure 27:
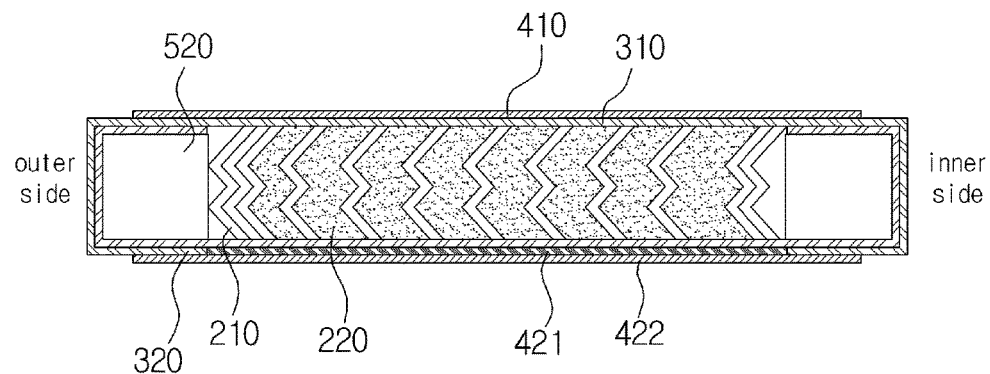
FIG. 27 is a cross-sectional view of a gasket according to the twenty-second exemplary embodiment of the present invention.

FIG. 27 is a cross-sectional view of a gasket according to the twenty-second exemplary embodiment of the present invention.

The gasket according to the twenty-second exemplary embodiment of the present invention is characterized in that the O-ring members 110 provided with the core springs 120 in the gasket according to the first exemplary embodiment are changed to the rectangular ring members 520.

The gasket according to the twenty-second exemplary embodiment of the present invention has an effect in that the O-ring members 110 are replaced by the rectangular ring members 520, thereby simplifying the manufacturing process thereof so that the manufacturing cost can be reduced.

Figure 28:
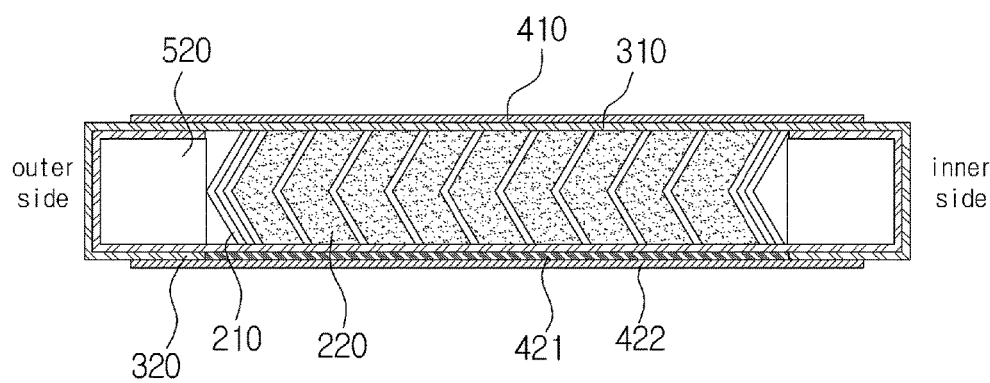
FIG. 28 is a cross-sectional view of a gasket according to the twenty-third exemplary embodiment of the present invention.

FIG. 28 is a cross-sectional view of a gasket according to the twenty-third exemplary embodiment of the present invention.

The gasket according to the twenty-third exemplary embodiment of the present invention is characterized in that the shape of the hoops 210 of the spiral wound gasket 200 according to the twenty-first exemplary embodiment are replaced from the shape of the letter 'W' to the letter 'V'.

The gasket according to the twenty-third exemplary embodiment of the present invention has an effect in that the manufacturing process thereof can be further simplified since the hoops 210 are needed to be folded only once during the manufacturing process of the hoops 210 of the spiral wound gasket 200.

Thus, the manufacturing cost can be reduced by the gasket according to the twenty-third exemplary embodiment of the present invention.

Figure 29:
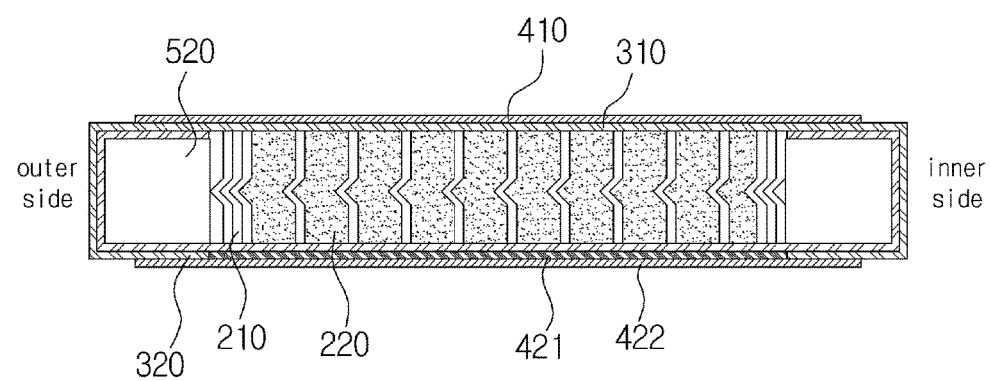
FIG. 29 is a cross-sectional view of a gasket according to the twenty-fourth exemplary embodiment of the present invention.

FIG. 29 is a cross-sectional view of a gasket according to the twenty-fourth exemplary embodiment of the present invention.

The gasket according to the twenty-fourth exemplary embodiment of the present invention is characterized in that the hoops of the spiral wound gasket 200 of the gasket according to the twenty-second exemplary embodiment are replaced by the plate type hoops wherein a protruded portions are formed.

Figure 30:
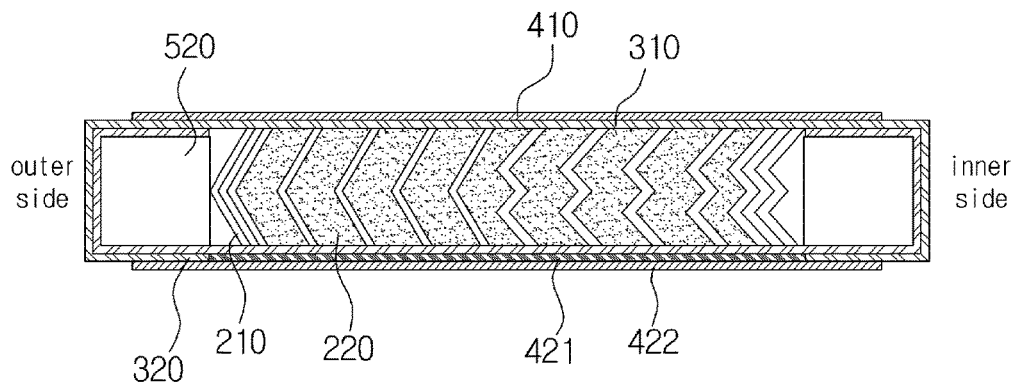
FIG. 30 is a cross-sectional view of a gasket according to the twenty-fifth exemplary embodiment of the present invention.

FIG. 30 is a cross-sectional view of a gasket according to the twenty-fifth exemplary embodiment of the present invention.

The gasket according to the twenty-fifth exemplary embodiment of the present invention may have the hoops 210 of the spiral wound gasket 200 in the gasket according to the twenty-second exemplary embodiment wherein the hoops 210 located in the outer portion of the gasket may have the shape of the letter 'V', and the hoops 210 located in the inner portion of the gasket may have the shape of the letter 'W'.

The gasket according to the twenty-fifth exemplary embodiment of the present invention has an effect in that the high pressure around the flange pipe path is being distributedly applied owing to the 'W' shaped hoops 210, therefore the restoring force can be enhanced, and thus, the aimed sealing property can be obtained at a lower cost.

Figure 31:
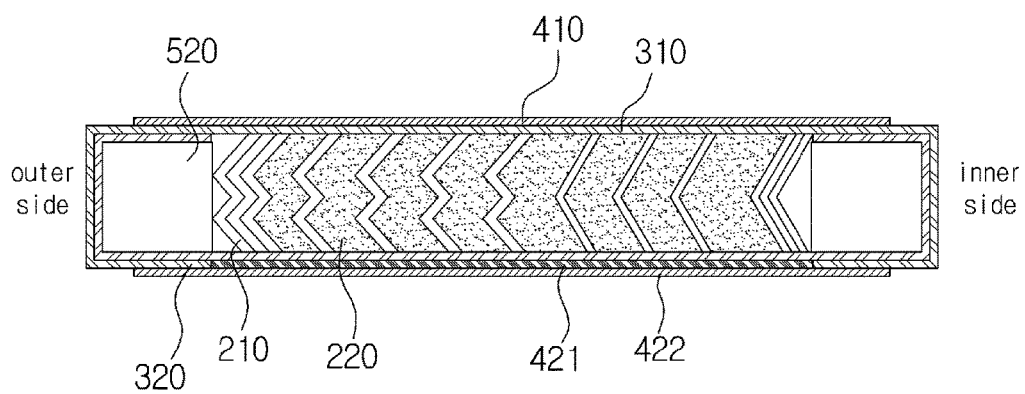
FIG. 31 is a cross-sectional view of a gasket according to the twenty-sixth exemplary embodiment of the present invention.

FIG. 31 is a cross-sectional view of a gasket according to the twenty-sixth exemplary embodiment of the present invention.

The gasket according to the twenty-sixth exemplary embodiment of the present invention is characterized in that the shapes of the hoops 210 located in the outer portion and the hoops 210 located in the inner portion of the spiral wound gasket 200 of gasket according to the twenty-fifth exemplary embodiment are being switched. That is, the 'W' shaped hoops 210 are disposed in the outer portion of the spiral wound gasket 200, and the 'V' shaped hoops 210 are disposed in the inner portion thereof.

Thus, the gasket according to the twenty-sixth exemplary embodiment of the present invention has an effect in that a high restoring force can be obtained in a specific structure wherein a higher pressure is applied to the outer side than the side towards the pipe path based on the structure of the flange.

Figure 32:
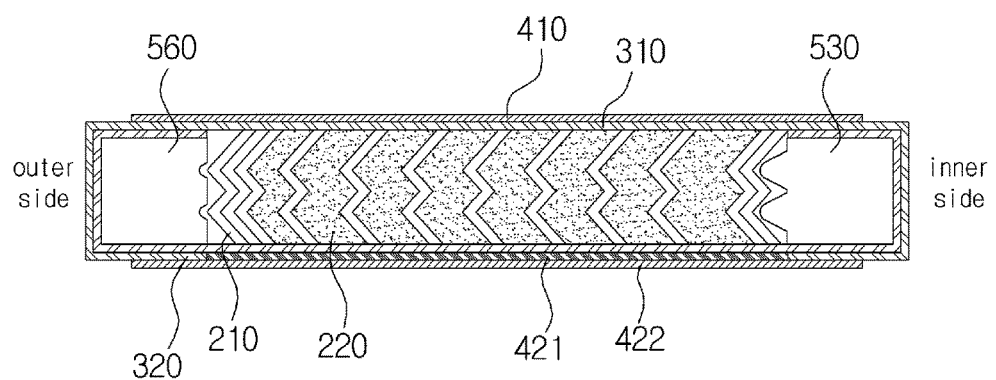
FIG. 32 is a cross-sectional view of a gasket according to the twenty-seventh exemplary embodiment of the present invention.

FIG. 32 is a cross-sectional view of a gasket according to the twenty-seventh exemplary embodiment of the present invention.

The gasket according to the twenty-seventh exemplary embodiment of the present invention is characterized in that the rectangular ring member 520 of the gasket according to the twenty-second exemplary embodiment is replaced by the concave and convex ring member 530.

The concave and convex ring member 530 according to the twenty-seventh exemplary embodiment of the present invention may be located so as to be respectively touched by the outer side and the inner side of the spiral wound gasket 200. And, such concave and convex portion may be formed in a way that when the concave and convex ring member 530 is moving towards the spiral wound gasket 200 by the pressure inside or outside of the flange so that the hoops of the spiral wound gasket 200 are being widened. That is, the concave and convex and the groove portions of the concave and convex ring members 530 may be formed in the shape similar to that of the hoops, and performs the role of widening the hoops of the spiral wound gasket 200 when it is being pushed while in contact with them (the ring members).

Figure 33:
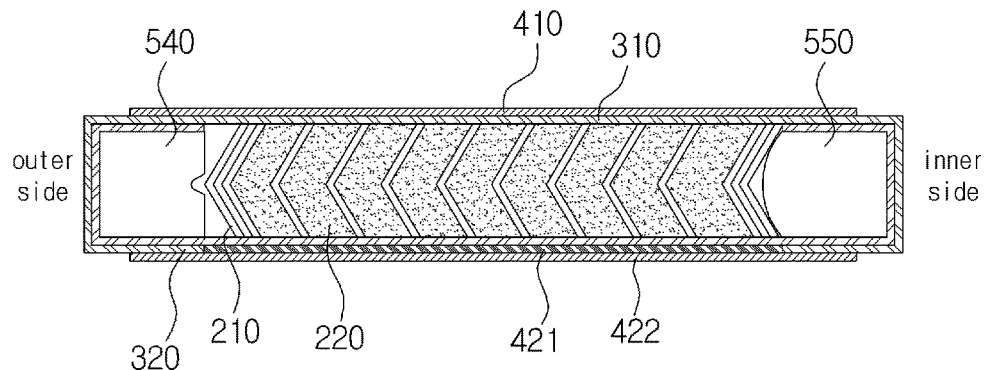
FIG. 33 is a cross-sectional view of a gasket according to the twenty-eighth exemplary embodiment of the present invention.

FIG. 33 is a cross-sectional view of a gasket according to the twenty-eighth exemplary embodiment of the present invention.

'V' shaped hoops may be adopted as the hoops 210 of the spiral wound gasket 200 of the gasket according to the twenty-eighth exemplary embodiment of the present invention.

And, an outer ring member 540 and an inner ring member 550 may be provided in the outer portion and the inner portion of the spiral wound gasket 200 respectively wherein the concave and convex and the groove portions are formed to facilitate the widening of the 'V' shaped hoops.

Thus, the manufacturing process of the spiral wound gasket 200 of the gasket can be simplified, and the outer ring member 540 and the inner ring member 550 are located in the outer side and the inner side of the spiral wound gasket 200 so that when the fluid is leaking out from the joint surface of the flange, the hoops of the spiral wound gasket 200 are being widened, thereby maximizing the sealing effect.

Figure 34:
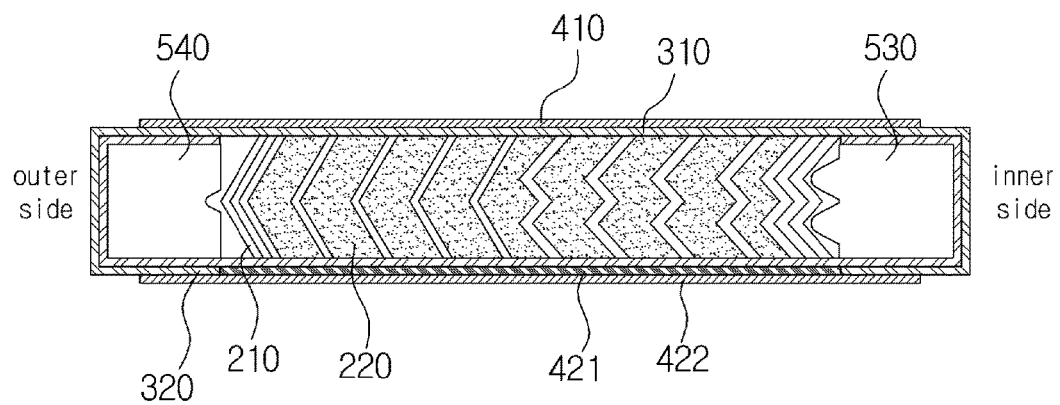
FIG. 34 is a cross-sectional view of a gasket according to the twenty-ninth exemplary embodiment of the present invention.

FIG. 34 is a cross-sectional view of a gasket according to the twenty-ninth exemplary embodiment of the present invention.

'V' shaped hoops may be provided in the outer side of the spiral wound gasket 200 of the gasket according to the twenty-ninth exemplary embodiment of the present invention and 'W' shaped hoops may be provided in the inner side thereof.

And, an outer ring member 540 may be located in the outer side of the spiral wound gasket 200, and a concave and convex ring member 530 may be located in the inner side of the spiral wound gasket 200. That is, the outer ring member 540 may be located in the outer side of the gasket so as to conform to the shape of the 'V' shaped hoop 210, and the concave and convex ring member 530 similar to the concave and convex shape of the 'W' shaped hoop 210 may be located in the inner side of the gasket.

Thus, there is an effect in that when the pressure is applied to the gasket adopted to the joint surfaces of the flanges from the inside and the outside, the outer ring member 540 and the concave and convex ring member 530 are compressing the spiral wound gasket 200 from the both sides or from one side so as to widen the hoops, thereby maximizing the sealing effect.

Figure 35:
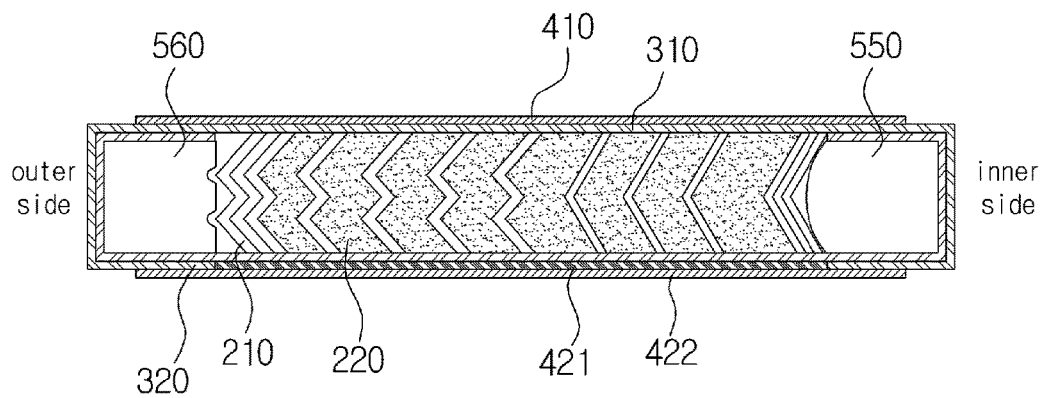
FIG. 35 is a cross-sectional view of a gasket according to the thirtieth exemplary embodiment of the present invention.

FIG. 35 is a cross-sectional view of a gasket according to the thirtieth exemplary embodiment of the present invention.

'W' shaped hoops may be mounted in the outer side as the hoops 210 of the spiral wound gasket 200 of the gasket according to the thirtieth exemplary embodiment of the present invention and 'V' shaped hoops may be mounted in the inner side thereof.

In addition, an outer ring member 560 with two grooves may be located in the outer side of the spiral wound gasket 200, and an inner ring member 550 may be located in the inner side of the spiral wound gasket 200.

Thus, when the fluid is leaking out from the joint surface of the flange, the outer ring member 540 and the inner ring member 550 are being compressed towards the spiral wound gasket 200 so that the hoops 210 are being widened.

Therefore, there is an effect in that since the gasket is in tight contact with the joint surfaces of the flanges leaking out of the fluid towards the outside can be prevented thereby.

According to a gasket and manufacturing method thereof disclosed in a preferred exemplary embodiment of the present invention, there are advantageous effects as follows.

Firstly, there is an effect in that a high clamping force and restoring force can be obtained when compared to other gasket of the same size. Therefore, there is an effect that the sealing effect is enhanced even under a high temperature and a high pressure conditions.

Secondly, there is an effect in that since both of the upper side and the lower side are encased with a metal jacket, the separation of the hoop or the filler of the spiral wound gasket can be prevented even when mounting the gasket with a high load.

Thirdly, there is an effect in that since the O-ring members provided with core springs are disposed in both side of the spiral wound gasket, the compression phenomenon of the gasket can be suppressed. Therefore, for a gasket and manufacturing method thereof according to a preferred exemplary embodiment of the present invention, there is an effect of enhancing the restoring force and the sealing property.

Fourthly, there is an effect in that the C-ring members are disposed in both sides of the spiral wound gasket, and when the fluid is leaking out from the joint surface of the flange, such C-ring members are expanded so that the hoops of the spiral wound gasket are widely opened, thereby maintaining the sealing of the joint surface more firmly.

Fifthly, there is an effect in that since the height difference between the jackets encasing the spiral wound gasket can be removed by utilizing the sealing layers, the pressure applied inside the gasket can be adjusted uniformly.

Sixthly, there is an effect in that by further providing sealing layers formed with carbon, mica, ceramics, silver, and the like in the upper and the lower surfaces of the gasket, the tight contact of the joint surface between the gasket and the flange can be maintained more firmly.

Seventhly, there is an effect in that by providing an inner sealing layer on the spiral wound gasket of the gasket, the pressures being applied to various portions of the spiral wound gasket can be delivered equally.

Eighthly, there is an effect in that by using a flat coil spring as a core spring inside of the O-ring member or the C-ring member, the restoring force can be obtained and at the same time the pressures are being equally distributed, thereby extending the lifetime of the gasket.

Although the present invention herein has been described with reference to the preferred embodiments as described above, it will be apparent to those skilled in the art that various changes and modification may be made to the above described embodiments, without departing from the scope and spirit of the present invention as disclosed in the accompanying claims.

What is claimed is:

1. A gasket characterized in that and including:
a spiral wound gasket;
a first core spring located inner side of said spiral wound gasket;
a second core spring located outer side of said spiral wound gasket; and
a first jacket and a second jacket being contacted to each other so as to form an enclosed space, wherein said spiral wound gasket, said first core spring, and said second core spring are internally accommodated.

2. The gasket according to claim 1,
characterized in that
said second jacket is formed with an opening portion in one side thereof, and wherein said spiral wound gasket, said first core spring, said second core spring, and said first jacket are internally accommodated through said opening portion.

3. The gasket according to claim 2,
characterized in that
a sealing layer is further included so as to cover said first jacket and the opening portion of said second jacket.

4. A gasket characterized in that and including:
a spiral wound gasket;
a first O-ring member located inner side of said spiral wound gasket;
a second O-ring member located outer side of said spiral wound gasket;
a first jacket and a second jacket being contacted to each other so as to form an enclosed space wherein said spiral wound gasket, said first O-ring member, and said second O-ring member are internally accommodated.

5. The gasket according to claim 4,
characterized in that
said second jacket is formed with an opening portion in one side thereof, and wherein said spiral wound gasket, said first O-ring member, said second O-ring member, and said first jacket are internally accommodated through said opening portion.

6. The gasket according to claim 5,
characterized in that
a sealing layer is further included so as to cover the opening portion of said second jacket and said first jacket.

7. A gasket characterized in that and including:
a spiral wound gasket;
a first O-ring member located inner side of said spiral wound gasket;
a second O-ring member located outer side of said spiral wound gasket;
a first core spring located inside said first O-ring member;
a second core spring located inside said second O-ring member;
a first jacket formed with an opening portion at the one end thereof and accommodating said spiral wound gasket, said first O-ring member, and said second O-ring member inside thereof through said opening portion;
an inner sealing layer being formed on said spiral wound gasket through the opening portion of said first jacket;
a second jacket formed with an opening portion at the one end thereof and accommodating said spiral wound gasket, said first O-ring member, said second O-ring member, said inner sealing layer and said first jacket inside thereof through said opening portion;
an outer sealing layer formed to cover said first jacket through the opening portion of said second jacket;
a third sealing layer being formed on said second jacket in the opposite side of said outer sealing layer.

8. The gasket according to claim 7,
characterized in that
said spiral wound gasket is formed by winding the hoops and the fillers alternately and repeatedly, and said hoops are formed in the shape of an inverted "W" comprising two peaks and one valley, and the two peaks of said hoops are directing towards the outside of said gasket.

9. The gasket according to claim 8,
characterized in that
said filler is formed with any one of carbon, ceramics, and mica, or formed with a combination of these elements.

10. A gasket characterized in that and including:
a spiral wound gasket;
a first C-ring member located inner side of said spiral wound gasket;
a second C-ring member located outer side of said spiral wound gasket;
a first core spring located inside said first C-ring member;
a second core spring located inside said second C-ring member;
a first jacket formed with an opening portion at the one end thereof and accommodating said spiral wound gasket, said first C-ring member, and said second C-ring member inside thereof through said opening portion;
a second jacket formed with an opening portion at the one end thereof and accommodating said spiral wound gasket, said first O-ring member, and said second O-ring member, and said first jacket inside thereof through said opening portion;
a first sealing layer being formed on said first jacket through the opening portion of said second jacket;
a second sealing layer being formed to cover said first sealing layer; and
a third sealing layer being formed on said second jacket in the opposite side of said first sealing layer.

11. The gasket according to claim 10,
characterized in that
the opening portion of said first C-ring member is formed towards the inner side of said gasket, and
the opening portion of said second C-ring member is formed towards the inner side of said gasket.

12. The gasket according to claim 10,
characterized in that
the opening portion of said first C-ring member is formed towards the outer side of said gasket, and
the opening portion of said second C-ring member is formed towards the outer side of said gasket.

13. The gasket according to claim 10,
characterized in that
the opening portion of said first C-ring member is formed towards the contact surface of the flange wherein said gasket is installed, and
the opening portion of said second C-ring member is formed towards the contact surface of the flange wherein said gasket is installed.

14. The gasket according to claim 10,
characterized in that
the opening portion of said first C-ring member is formed towards the inner side of said gasket, and
the opening portion of said second C-ring member is formed towards the outer side of said gasket.

15. The gasket according to claim 10,
characterized in that
said spiral wound gasket is formed by winding the hoops and the fillers alternately and repeatedly, and said hoops are formed in the shape of an inverted "W" comprising two peaks and one valley, and the two peaks of said hoops are directing towards the outside of said gasket.

16. The gasket according to claim 15,
characterized in that said filler is formed with any one of carbon, ceramics, and mica, or formed with a combination of these elements.

17. The gasket according to claim 10,
characterized in that
said first sealing layer, said second sealing layer, and said third sealing layer are formed with any one of carbon, mica, polytetrafluoroethylene (PTFE), silver, and atomized stainless steel, or a combination of these elements.

18. A gasket characterized in that and including:
a spiral wound gasket;
a first C-ring member located inner side of said spiral wound gasket;
a second C-ring member located outer side of said spiral wound gasket;
a first core spring located inside said first C-ring member;
a second core spring located inside said second C-ring member;
a first jacket formed with an opening portion at the one end thereof and accommodating said spiral wound gasket, said first C-ring member, and said second C-ring member inside thereof through said opening portion;
an inner sealing layer being formed on said spiral wound gasket through the opening portion of said first jacket;
a second jacket formed with an opening portion at the one end thereof and accommodating said spiral wound gasket, said first O-ring member, and said second O-ring member, said inner sealing layer, and said first jacket inside thereof through said opening portion;
an outer sealing layer formed to cover said first jacket through the opening portion of said second jacket;
a third sealing layer being formed on said second jacket in the opposite side of said outer sealing layer.

19. The gasket according to claim 18,
characterized in that
the opening portion of said first C-ring member is formed towards the inner side of said gasket, and
the opening portion of said second C-ring member is formed towards the inner side of said gasket.

20. The gasket according to claim 18,
characterized in that
the opening portion of said first C-ring member is formed towards the outer side of said gasket, and
the opening portion of said second C-ring member is formed towards the outer side of said gasket.

21. The gasket according to claim 18,
characterized in that
the opening portion of said first C-ring member is formed towards the contact surface of the flange wherein said gasket is installed, and
the opening portion of said second C-ring member is formed towards the contact surface of the flange wherein said gasket is installed.

22. The gasket according to claim 18,
characterized in that
the opening portion of said first C-ring member is formed towards the inner side of said gasket, and
the opening portion of said second C-ring member is formed towards the outer side of said gasket.

23. The gasket according to claim 18,
characterized in that
said spiral wound gasket is formed by winding the hoops and the fillers alternately and repeatedly, and said hoops are formed in the shape of an inverted "W" comprising two peaks and one valley, and the two peaks of said hoops are directing towards the outside of said gasket.

24. The gasket according to claim 23,
characterized in that said filler is formed with any one of carbon, ceramics, and mica, or formed with a combination of these elements.

* * * * *